US007905804B2

(12) United States Patent
Yamaguchi et al.

(10) Patent No.: US 7,905,804 B2
(45) Date of Patent: Mar. 15, 2011

(54) BICYCLE DERAILLEUR

(75) Inventors: Souta Yamaguchi, Sakai (JP); Shinya Oseto, Sakai (JP)

(73) Assignee: Shimano Inc., Osaka (JP)

(*) Notice: Subject to any disclaimer, the term of this patent is extended or adjusted under 35 U.S.C. 154(b) by 392 days.

(21) Appl. No.: 11/517,429

(22) Filed: Sep. 8, 2006

(65) Prior Publication Data

US 2008/0064544 A1 Mar. 13, 2008

(51) Int. Cl.
*F16H 9/00* (2006.01)

(52) U.S. Cl. ........................................................ 474/80

(58) Field of Classification Search .................... 474/80, 474/82, 81; *B62M 9/12*
See application file for complete search history.

(56) References Cited

U.S. PATENT DOCUMENTS 3,927,904 A * 12/1975 Bergles ........................ 280/236
4,235,118 A * 11/1980 Huret ............................ 474/82
4,469,479 A * 9/1984 Ozaki ............................ 474/80
4,690,663 A 9/1987 Nagano
5,421,786 A 6/1995 Ando
5,498,211 A * 3/1996 Hsu ................................ 474/80
5,931,753 A 8/1999 Ichida
5,961,409 A 10/1999 Ando
6,287,228 B1 9/2001 Ichida
6,350,212 B1 2/2002 Campagnolo
2002/0065158 A1 5/2002 Meggiolan
2003/0083162 A1 5/2003 Tsai
2003/0171175 A1* 9/2003 Shahana et al. ................ 474/80
2004/0106482 A1 6/2004 Nagano
2004/0110586 A1 6/2004 Shahana
2004/0110587 A1 6/2004 Shahana
2004/0116222 A1 6/2004 Shahana
2004/0254038 A1 12/2004 Chamberlain
2008/0051237 A1* 2/2008 Shahana ........................ 474/82

FOREIGN PATENT DOCUMENTS

FR 50 197 1/1940
GB 2 249 605 A 5/1992

* cited by examiner

*Primary Examiner* — Robert A Siconolfi
*Assistant Examiner* — Stephen Bowes
(74) *Attorney, Agent, or Firm* — Global IP Counselors, LLP

(57) ABSTRACT

A bicycle derailleur mounting structure includes a base member and a stopper. The base member includes a first portion configured for attachment to a bicycle frame. The first portion of the base member has a first side surface and a second side surface with an aperture extending between the first and second side surfaces. The stopper is coupled to the base member between the first and second side surfaces. The stopper is configured for setting an angular position of the base member relative to the bicycle frame.

15 Claims, 5 Drawing Sheets

14
16
18
A
9
30
40
50a
52
78
9
49
P
26
36
32
33
34

BICYCLE DERAILLEUR

BACKGROUND OF THE INVENTION

1. Field of the Invention

This invention generally relates to a bicycle rear derailleur. More specifically, the present invention relates to a stopper that limits pivotal movement of a base member of the bicycle rear derailleur relative to the bicycle frame.

2. Background Information

Bicycling is becoming an increasingly more popular form of recreation as well as a means of transportation. Moreover, bicycling has become a very popular competitive sport for both amateurs and professionals. Whether the bicycle is used for recreation, transportation or competition, the bicycle industry is constantly improving the various components of the bicycle. One component that has been extensively redesigned is the bicycle rear derailleur.

In many rear derailleur configurations, a base member of the rear derailleur includes a mounting axle that extends through the base member and into a portion of the bicycle frame. The mounting axle allows for limited pivotal movement of the base member relative to the bicycle frame. Further, such rear derailleurs often include a stopper member disposed between the base member and the bicycle frame that restricts the pivotal movement of the base member relative to the bicycle frame. Additionally the stopper member and/or bicycle frame can include an adjustment for setting an angular stop position of the base member relative to the bicycle frame. In some rear derailleur configurations, the adjustment for setting the angular stop position of the base member includes an adjuster bolt extending through a threaded aperture in the base member that contact the stopper member providing angular stop position adjustment.

With the stopper member disposed between the base member and the bicycle frame, the base member is spaced apart from the bicycle frame. In order to avoid rocking movement in a direction perpendicular to the pivotal movement of the base member about the mounting axle, the base member must be widened and the mounting axle must be elongated. The additional length of the mounting axle and widened base member are not desirable in current rear derailleur designs where mass and space are important design considerations.

In view of the above, it will be apparent to those skilled in the art from this disclosure that there exists a need for an improved rear derailleur that includes a stopper member configuration that does not require a widened base member and elongated mounting axle. This invention addresses this need in the art as well as other needs, which will become apparent to those skilled in the art from this disclosure.

SUMMARY OF THE INVENTION

One object of the present invention is to provide a simple mechanism for adjusting an angular stop position of a base member of a rear derailleur without increasing rocking or pivotal movement of the base member relative to the frame of a bicycle.

Another object of the present invention is to provide a stopper for a base member of a rear derailleur with a minimum overall mounting axle length.

In accordance with one aspect of the present invention, a bicycle derailleur mounting structure includes a base member and a stopper. The base member includes a first portion configured for attachment to a bicycle frame. The first portion of the base member has a first side surface and a second side surface with an aperture extending between the first and second side surfaces. The stopper is coupled to the base member between the first and second side surfaces. The stopper is configured for setting an angular position of the base member relative to the bicycle frame.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
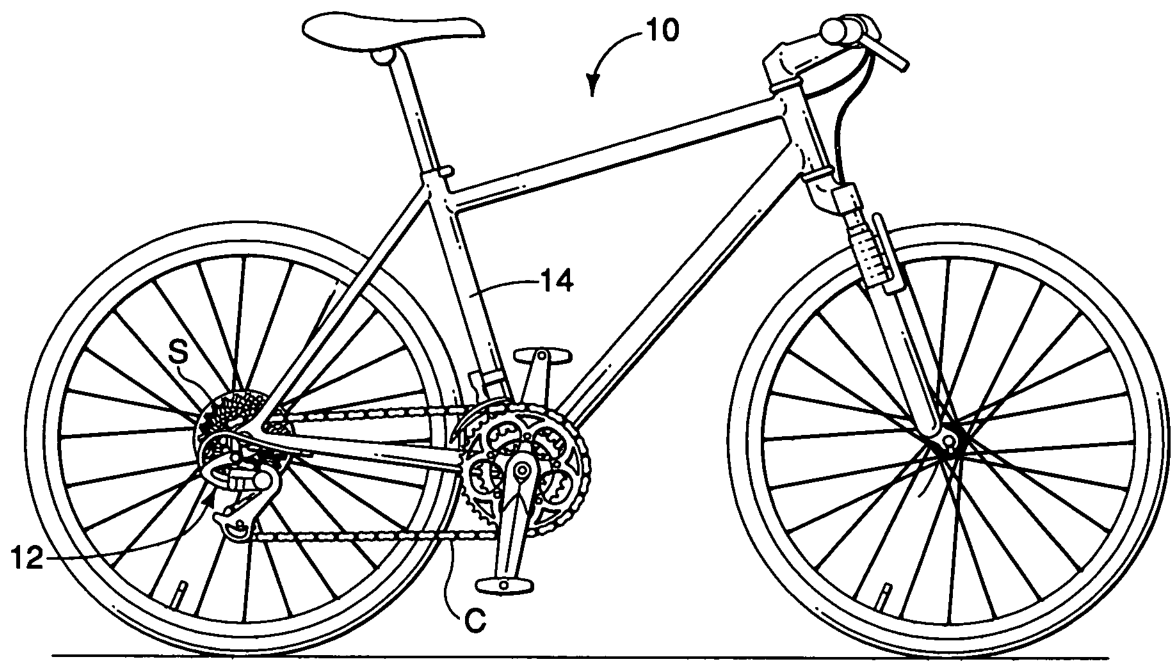
FIG. 1 is a side elevational view of a bicycle showing a rear derailleur in accordance with one embodiment of the present invention.
Figure 2:
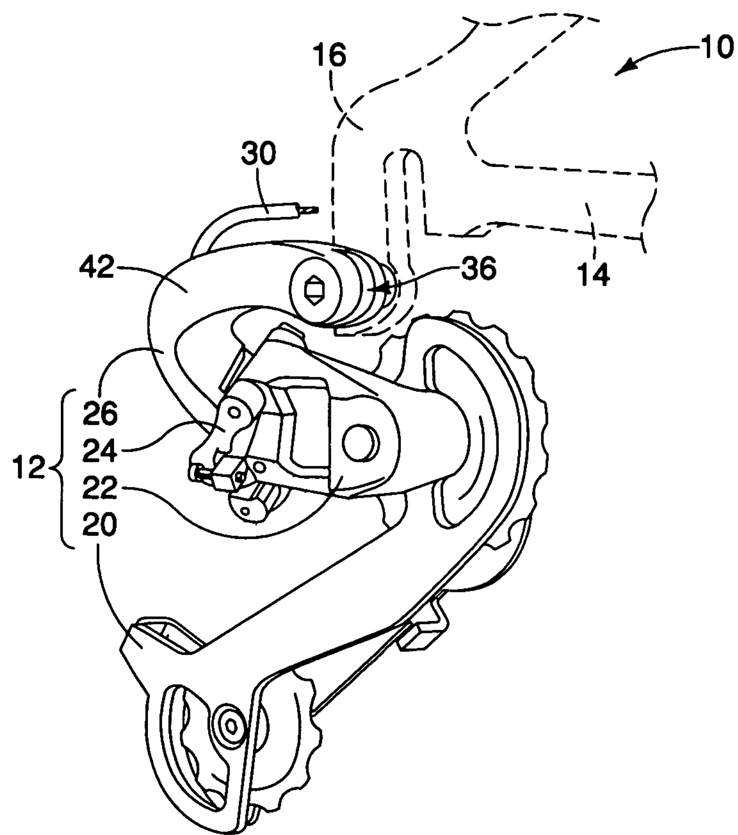
FIG. 2 is a perspective view of an outboard side of the rear derailleur showing a base member with a stopper in accordance with one embodiment of the present invention.
Figure 3:
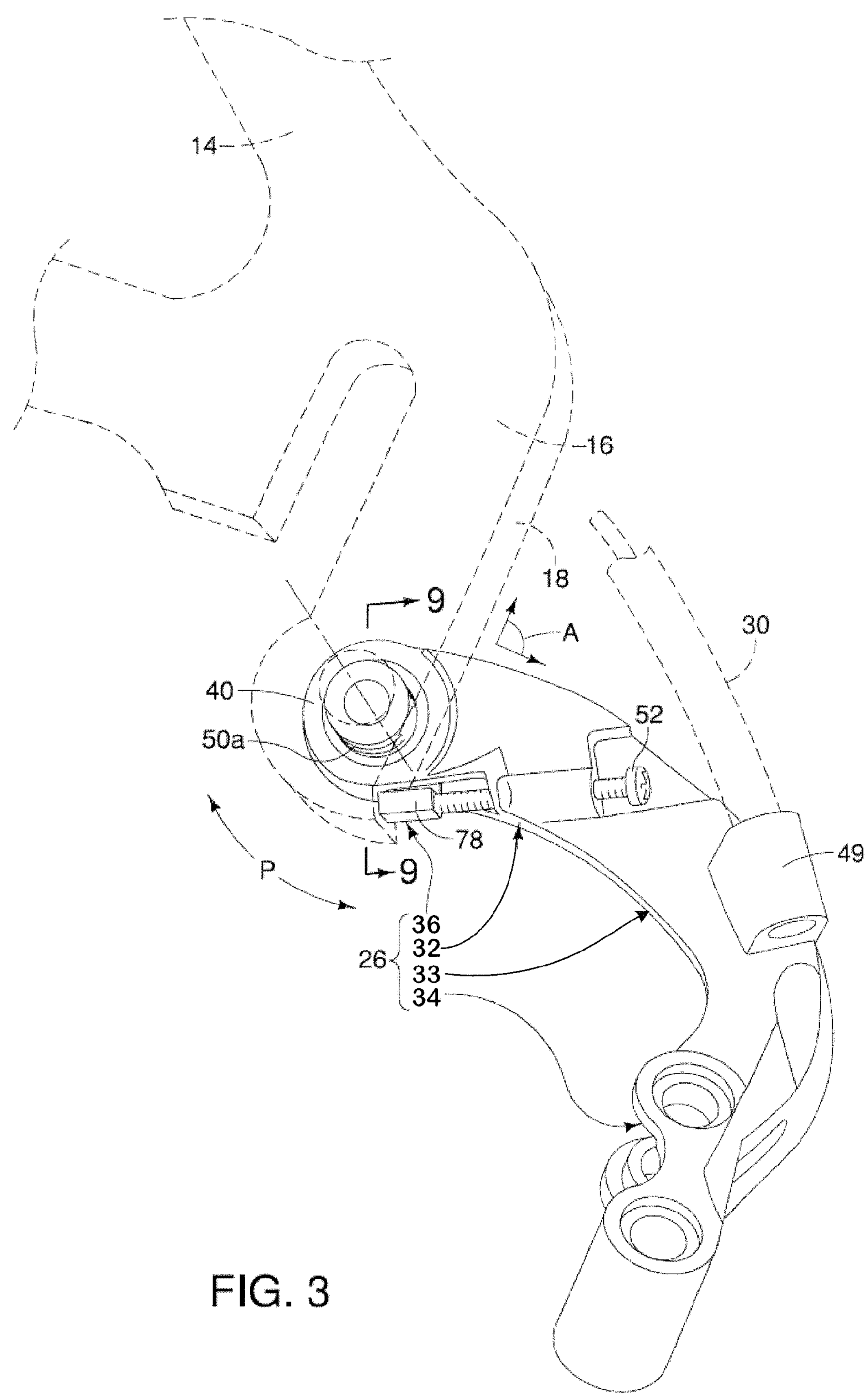
FIG. 3 is a perspective view of an inboard side of the base member of the rear derailleur installed on the bicycle with portions of the rear derailleur removed to show features of the stopper in accordance with one embodiment of the present invention.

Referring initially to FIGS. 1 and 2, a bicycle 10 is illustrated that is equipped with a rear derailleur 12 in accordance with a first embodiment of the present invention. As shown in FIG. 2, the bicycle 10 includes a frame 14 having a rear portion 16. The rear derailleur 12 attached to the rear portion 16 of the frame 14. As shown in FIG. 3, the rear portion 16 includes a contact surface 18.

Referring again to FIG. 2, the rear derailleur 12 basically includes a chain guide 20 and a main derailleur body that includes a movable member 22, a linkage assembly 24 and a base member 26.

The chain guide 20 (e.g., a chain cage) is supported by the movable member 22 in a conventional manner for guiding a chain C to move between chain sprockets of a sprocket set S shown in FIG. 1. The movable member 22 is movably connected to the linkage assembly 24 in a conventional manner for movement between a plurality of chain positioning orientations. The chain guide 20 is pivotally connected to the movable member 22 in a conventional manner and moves with the movable member 22 effecting movement of the chain C. The linkage assembly 24 is also coupled to the base member 26 in a conventional manner.

With specific reference to FIGS. 3-9, a description of the base member 26 is now provided. The base member 26 basically includes a first portion 32, a central portion 33, a second portion 34 and a position adjusting mechanism or stopper 36.

Figure 4:
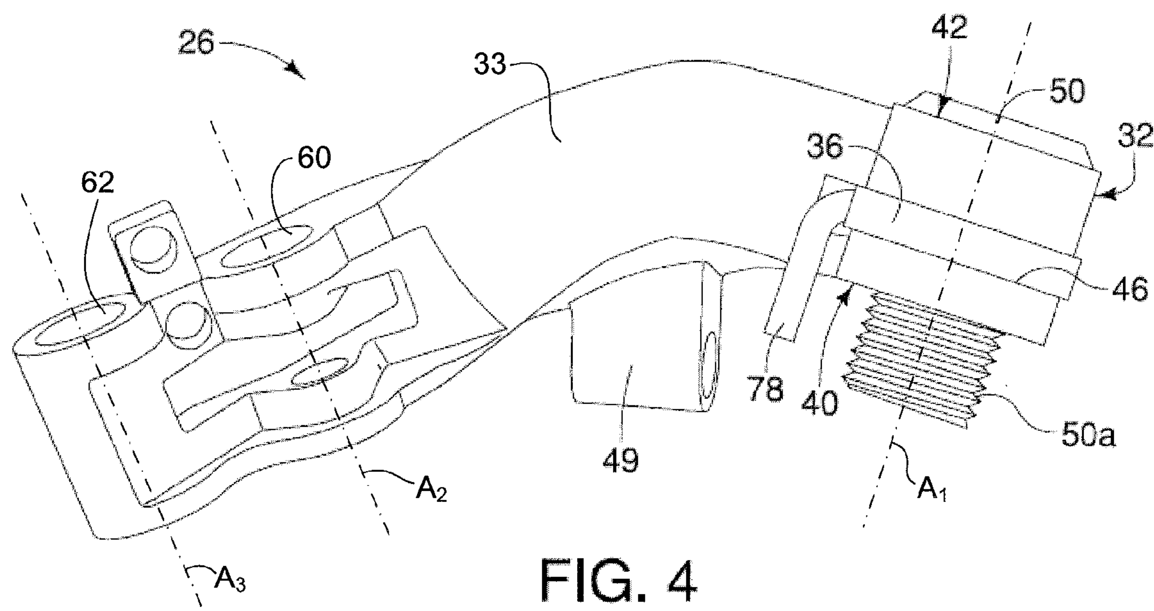
FIG. 4 is a perspective view of the base member and stopper shown completely removed from the rear derailleur in accordance with one embodiment of the present invention.
Figure 6:
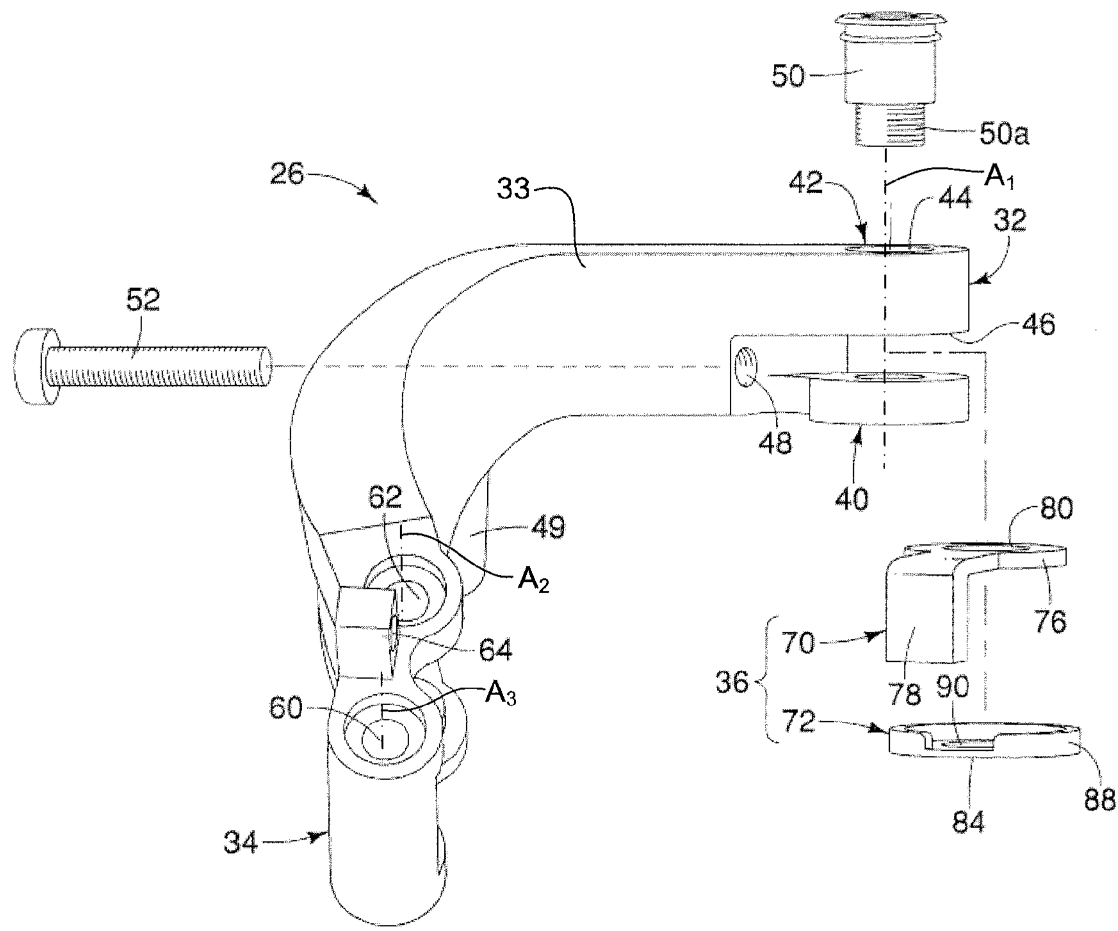
FIG. 6 is an exploded perspective view of the base member and stopper showing an adjustment bolt, a stopper member and a washer of the stopper in accordance with one embodiment of the present invention.

The first portion 32 of the base member 26 is configured for attachment to the frame 14, as described below. The first portion 32 basically includes a first side surface 40, a second side surface 42, an aperture 44 (best shown in FIGS. 6 and 9), a slot 46 (best shown in FIGS. 6 and 9), a threaded aperture 48 (best shown in FIGS. 6 and 8), a cable retainer 49 and a mounting axle 50. With the base member 26 installed on the frame 14, the first side surface 40 faces the frame 14 and the second side surface 42 faces away from the frame 14. The aperture 44 (a mounting aperture) extends between the first and second side surfaces 40 and 42. The aperture 44 further extends in a direction that is generally perpendicular to the first and second side surfaces 42. The aperture 44 further defines a pivot axis $A_1$, as shown in FIGS. 4 and 6.

The slot 46 extends in a direction generally parallel to the first and second surfaces 40 and 42. The slot 46 extends in a direction generally perpendicular to the aperture 44. The slot 46 is further preferably provided with an annular shape to receive the stopper 36, as described in greater detail below.

Figure 5:
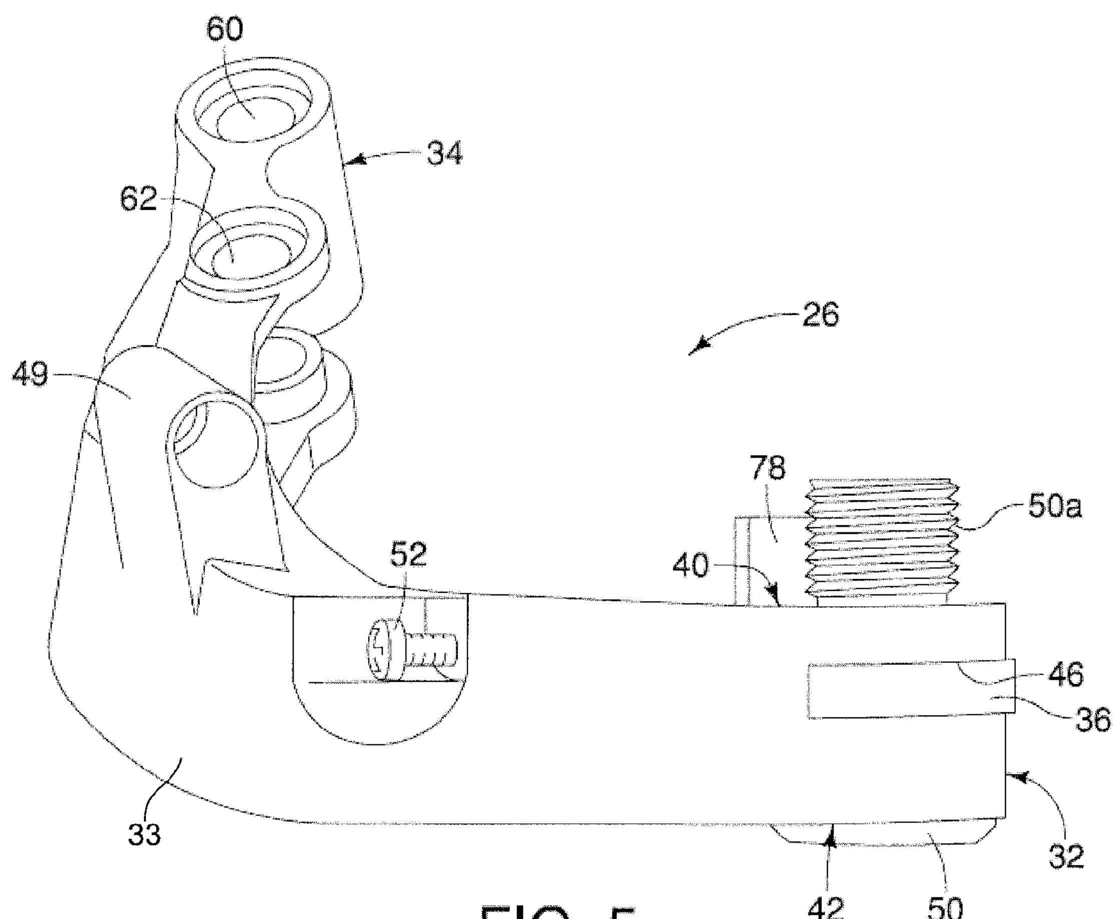
FIG. 5 is another perspective view of the base member and stopper shown removed from the rear derailleur in accordance with one embodiment of the present invention.

The threaded aperture 48 extends in a direction generally parallel to the orientation of the first and second side surfaces 40 and 42 and the slot 46. The threaded aperture 48 is formed in the first portion 32 of the base member 26 between the slot 46 and the first side surface 40. A bolt 52 (an adjuster) is disposed in the threaded aperture 48 as shown in FIGS. 3, 5 and 6. The bolt 52 and threaded aperture 48 are oriented such that the bolt 52 engages a portion of the stopper 36, as shown in FIG. 3 and described in greater detail below.

The mounting axle 50 includes a threaded portion 50*a* and is installed in the aperture 44. The mounting axle 50 extends through the aperture 44 such that the threaded portion 50*a* engages a mounting hole in the rear portion 16 of the frame 14 of the bicycle 10. As indicated in FIGS. 4, 5, 6 and 9, the mounting axle 50 further extends through the slot 46. As best shown in FIGS. 3, 4, 5 and 6, the central portion 33 extends between the first portion 32 and the second portion 34. The central portion 33 has an overall curved shape. The central portion 33 is dimensioned such that the second portion 34 is spaced apart from the slot 46 and the first portion 32 by the central portion 33.

Figure 8:
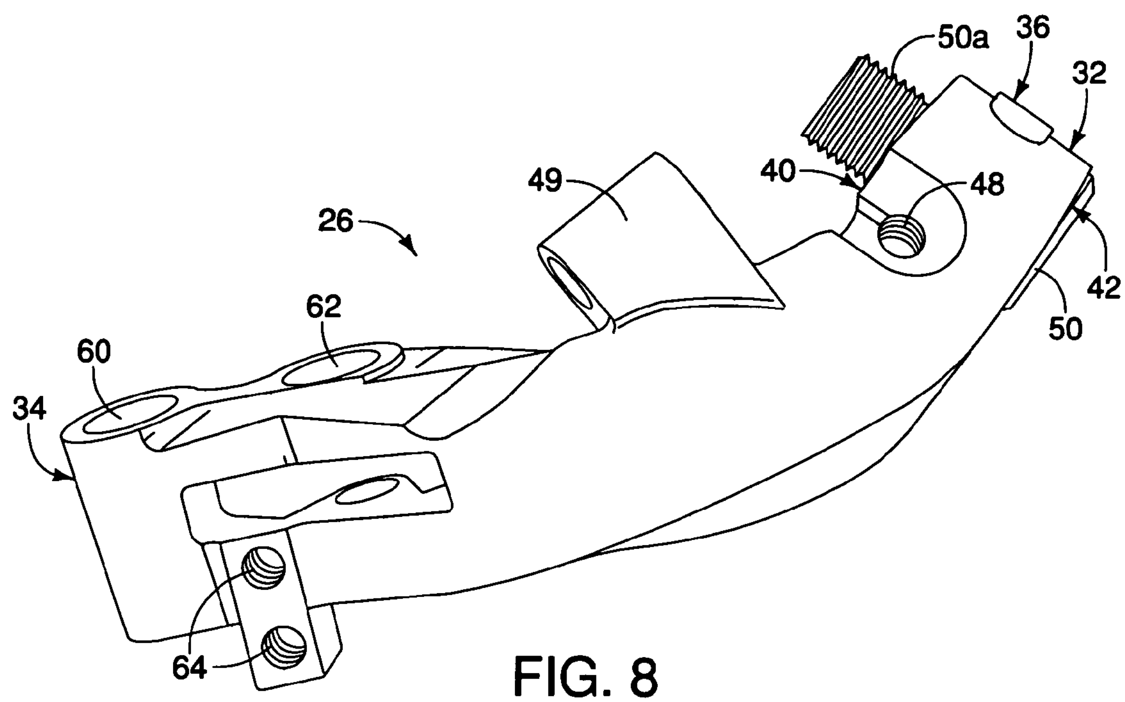
FIG. 8 is another perspective view of the base member and stopper shown removed from the rear derailleur in accordance with one embodiment of the present invention.

As best shown in FIGS. 6 and 8, the second portion 34 of the base member 26 includes a pair of conventional pivot apertures 60 and 62 and link adjuster apertures 64. The linkage assembly 24 includes pivot pins (not shown) that extend through the links of the linkage assembly 24 and further through pivot apertures 60 and 62 allowing the linkage assembly to undergo pivotal movement with respect to the base member 26 in a conventional manner. As indicated in FIGS. 4 and 6, the pivot apertures 60 and 62 each define pivot axis. Specifically, the pivot aperture 60 defines pivot axis $A_2$ and the pivot aperture 62 defines a pivot axis $A_3$. The links of the linkage assembly 24 pivot about the pivot axis $A_2$ and the pivot axis $A_3$ in a conventional manner. Also, as shown in FIGS. 4 and 6, the first axis $A_1$ is non-parallel to the pivot axis $A_2$ and the pivot axis $A_3$, while the pivot axis $A_2$ and the pivot axis $A_3$ are parallel to one another.

Figure 7:
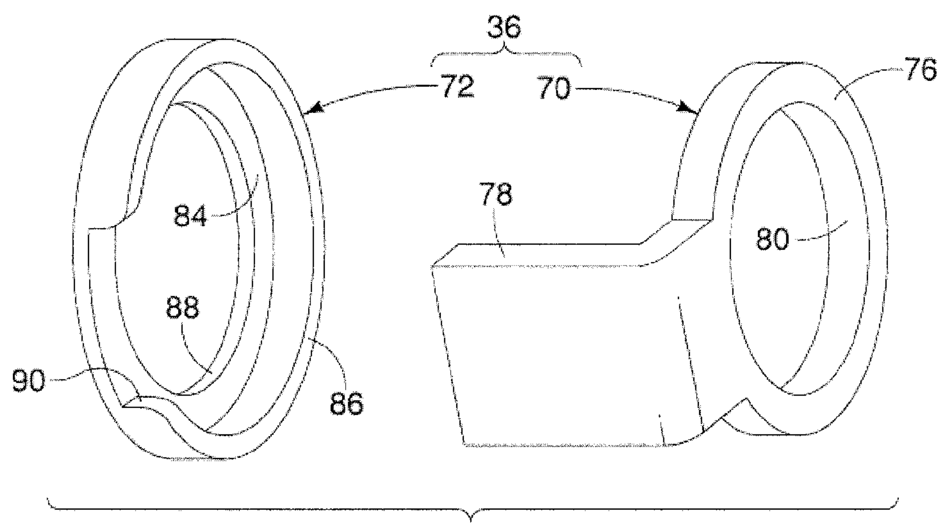
FIG. 7 is an exploded perspective view of the stopper showing the stopper member and the washer of the stopper in accordance with one embodiment of the present invention.
Figure 9:
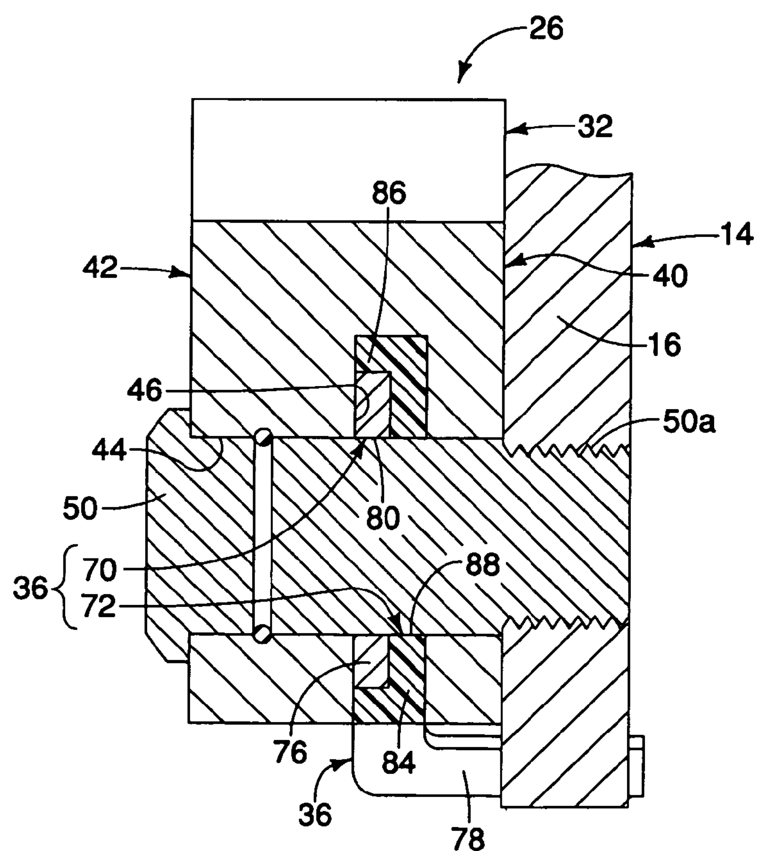
FIG. 9 is a cross-section of the base member and the stopper taken along the line 9-9 in FIG. 3.

With specific reference to FIGS. 6, 7 and 9, a description of the stopper 36 is now provided. The stopper 36 along with the bolt 52 is a position adjusting mechanism that is configured for selective adjustment of an angular stop position of the base member 26 relative to the frame 14. The angular stop position is an angle A (see FIG. 3) defined between the first portion 32 of the base member 26 and the rear portion 16 of the frame 14. The stopper 36 basically includes a stopper member 70 and a washer 72.

As shown in FIGS. 6 and 7, the stopper member 70 includes a ring portion 76 (a support portion) and a stop portion 78 that extends from the ring portion 76. The ring portion 76 includes a central opening 80 that is dimensioned to receive the mounting axle 50. The stop portion 78 extends in a direction that is perpendicular to the ring portion 76.

The washer 72 basically includes an annular ring portion 84 and a lip 86 that at partially extends in an axial direction from an outer edge of the annular ring portion 84. The annular ring portion 84 includes a central opening 88. The lip 86 includes a gap 90. The annular ring portion 84 of the washer 72 is dimensioned to at least partially cover an outer periphery of the ring portion 76 of the stopper member 70. In other words, a radially outward surface of the ring portion 76 of the stopper member 70 is at least partially covered by the lip 86 of the washer 72. The stop portion 78 extends through the gap 90 with the washer 72 installed on the ring portion 76.

The washer 72 can be made of any of a variety of materials, but is preferably made of a low friction material, such as plastic or other polymers that exhibit low friction contact with metallic materials.

With the ring portion 76 assembled to the washer 72, the stopper 36 is installed into the slot 46, as indicated in FIGS. 6 and 9. The mounting axle 50 extends through the aperture 44, the central opening 80 in the stopper member 70 and the central opening 88 in the washer 72. Hence, since the mounting axle 50 is mounted to the rear portion 16 of the frame 14, the stopper 36 is pivotally supported on the mounting axle 50. As shown in FIG. 3, the stop portion 78 of the stopper 36 extends inwardly (relative to the bicycle 10) and is positioned to contact the contact surface 18 of the rear portion 16 of the frame 14.

The mounting axle 50 is dimensioned and configured to allow the base member 26 to undergo pivotal movement relative to the frame 14, as indicated by the arrow P in FIG. 3. However, since the stop portion 78 of the stopper member 70 extends toward the frame 14, the stop portion 78 is positioned to contact the contact surface 18 of the rear portion 16 of the frame 14. Hence, the angular stop position (the angle A in FIG. 3) is initially established by contact between the contact surface 18 and the stop portion 78 of the stopper member 70.

The bolt 52 and threaded aperture 48 are oriented such that the bolt 52 also engages the stop portion 78 of the stopper 36. Rotating the bolt 52 in the threaded aperture 48 changes the relative position of the base member 26 with respect to the stop portion 78. Hence, the bolt 52 provides a mechanism for setting the angular position of the base member 26 relative the frame 14 (adjustment of the angular stop position, the angle A in FIG. 3). Hence, the angular stop position of the base member 26 can be adjusted in a simple manner.

Since the stopper 36 is disposed within the slot 46 between the first and second side surfaces 40 and 42, lengthening the mounting axle 50 and increasing the width of the base member 26 is not necessary to ensure stability of the base member 26 on the mounting axle 60. Hence, the mounting axle 50 can have a minimum length without adversely affecting rocking or pivoting movement of the base member 26 with respect to the frame 14. Further, the base member 26 is disposed adjacent to the bicycle frame 14 and is not spaced apart from the bicycle frame 14, as shown in FIG. 9.

GENERAL INTERPRETATION OF TERMS

In understanding the scope of the present invention, the term "configured" as used herein to describe a component, section or part of a device includes hardware and/or software that is constructed and/or programmed to carry out the desired function. In understanding the scope of the present invention, the term "comprising" and its derivatives, as used herein, are intended to be open ended terms that specify the presence of the stated features, elements, components, groups, integers, and/or steps, but do not exclude the presence of other unstated features, elements, components, groups, integers and/or steps. The foregoing also applies to words having similar meanings such as the terms, "including", "having" and their derivatives. Also, the terms "part," "section," "portion," "member" or "element" when used in the singular can have the dual meaning of a single part or a plurality of parts. As used herein to describe the present invention, the following directional terms "forward, rearward, above, downward, vertical, horizontal, below and transverse" as well as any other similar directional terms refer to those directions of a bicycle equipped with the present invention. Accordingly, these terms, as utilized to describe the present invention should be interpreted relative to a bicycle equipped with the present invention as used in the normal riding position. Finally, terms of degree such as "substantially", "about" and "approximately" as used herein mean a reasonable amount of deviation of the modified term such that the end result is not significantly changed.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents.

What is claimed is:

1. A bicycle derailleur mounting structure comprising:

a base member including a first portion, a central portion and a second portion, the first portion defining a proximal end of the base member and the second portion defining a distal end of the base member relative to the bicycle frame, the first portion having a first side surface, a second side surface with an aperture extending from the first side surface to the second side surface, with a slot defined by two axially facing surfaces disposed between the first side surface and the second side surface, the axially facing surfaces face in an axial direction with respect to a center axis of the aperture, the central portion extending between the first portion and the second portion such that the second portion is spaced apart from the slot and the first portion by the central portion, the second portion being configured to support a derailleur linkage assembly, the aperture extending through the first portion defines a first axis coaxial with the center axis of the aperture and the second portion includes at least one aperture that defines a second axis with a portion of the derailleur linkage assembly being pivotal about the second axis, the first axis and the second axis being non-parallel to one another, the first portion of the base member being attachable to a bicycle frame with the first axis of the aperture extending through the bicycle frame such that the base member pivots about the first axis relative to the bicycle frame; and a stopper having a support portion disposed in the slot between the axially facing surfaces of the slot, and the stopper being configured for setting an angular position of the base member relative to the bicycle frame.

2. The bicycle derailleur mounting structure as set forth in claim 1, wherein the support portion of the stopper is pivotally supported to the first portion of the base member between the first and second surfaces.

3. The bicycle derailleur mounting structure as set forth in claim 2 wherein the stopper includes a stop portion that extends from the support portion outward and away from the slot along an outer surface of the base member toward the bicycle frame for contact therewith.

4. The bicycle derailleur mounting structure as set forth in claim 1, wherein the slot extends in a direction generally parallel to at least one of the first and second surfaces.

5. The bicycle derailleur mounting structure as set forth in claim 1, wherein the stopper includes a stop portion that extends from the support portion outward and away from the slot along an outer surface of the base member toward the bicycle frame for contact therewith.

6. The bicycle derailleur mounting structure as set forth in claim 5, wherein the first portion of the base member includes a bolt disposed in a threaded aperture of the first portion, with the bolt contacting the stop portion of the stopper outside the slot adjacent to the outer surface of the base member.

7. The bicycle derailleur mounting structure as set forth in claim 1, further comprising:

a mounting axle extending through the aperture along the first axis, with the stopper being supported on the mounting axle for pivotal movement about the first axis.

8. The bicycle derailleur mounting structure as set forth in claim 1, wherein the first portion of the base member includes a bolt disposed in a threaded aperture of the first portion, with the bolt being oriented to engage a stop portion of the stopper.

9. A bicycle derailleur comprising:

a base member including a first portion configured for attachment to a bicycle frame defining a proximal end of the base member, a central portion and a second portion defining a distal end of the base member relative to the bicycle frame, the first portion of the base member having a first side surface, a second side surface with an aperture extending from the first side surface to the second side surface, with a slot defined by two axially facing surfaces disposed between the first side surface and the second side surface, the axially facing surfaces face in an axial direction with respect to a center axis of the aperture, the central portion extending between the first portion and the second portion such that the second portion is spaced apart from the slot and the first portion by the central portion, the aperture extending through the first portion defines a first axis coaxial with the center axis of the aperture and the second portion includes at least one aperture that defines a second axis with a portion of the derailleur linkage assembly being pivotal about the second axis, the first axis and the second axis being non-parallel to one another, the first portion of the base member being attachable to the bicycle frame with the first axis of the aperture extending through the bicycle frame such that the base member pivots about the first axis relative to the bicycle frame;

a stopper having a support portion disposed in the slot between the axially facing surfaces of the slot, and the stopper being configured for setting an angular position of the base member relative to the bicycle frame;

a linkage assembly pivotally coupled to the second portion of the base member; and a chain guide coupled to the linkage assembly.

10. The bicycle derailleur as set forth in claim 9, wherein the stopper includes a stop portion that extends from the support portion outward and away from the slot along an outer surface of the base member toward the bicycle frame for contact therewith.

11. The bicycle derailleur as set forth in claim 10, wherein the first portion of the base member includes a bolt disposed in a threaded aperture of the first portion, with the bolt being oriented to engage the stop portion of the stopper.

12. The bicycle derailleur as set forth in claim 11, further comprising:

a mounting axle extending through the aperture aligned with the first axis, with the stopper being supported on the mounting axle for pivotal movement about the first axis.

13. The bicycle derailleur as set forth in claim 1, wherein the central portion has a curved shape.

14. The bicycle derailleur as set forth in claim 9, wherein the central portion has a curved shape.

15. A bicycle derailleur mounting structure comprising:

a base member that is a single unitary element having a first portion, a central portion and a second portion with the central portion extending from the first portion to the second portion, the first portion having a first side surface and a second side surface, the first portion having an aperture extending from the first side surface to the second side surface, the aperture defining a first axis such that with the first portion attached to a bicycle frame the base member pivots relative to the bicycle frame about the first axis, the first portion having a slot disposed between the first side surface and the second side surface, the slot being defined by two axially facing surfaces disposed between the first and second side surfaces such that the first axis extends through the two axially facing surfaces, the second portion being spaced apart from the slot and the first portion by the central portion, the second portion including at least one aperture that defines a second axis with a portion of a derailleur linkage assembly being pivotal about the second axis, the first axis and the second axis being non-parallel to one another; and a stopper having a support portion disposed in the slot between the axially facing surfaces of the slot, and the stopper being configured for setting an angular position of the base member relative to the bicycle frame.

* * * * *